US012760156B2

(12) United States Patent
Su et al.

(10) Patent No.: US 12,760,156 B2
(45) Date of Patent: Oct. 13, 2026

(54) RUBBER VOICE DIAPHRAGM AND METHOD FOR PREPARING THE SAME, AND SPEAKER

(71) Applicant: AAC Technologies (Nanjing) Co., Ltd., Nanjing (CN)

(72) Inventors: Yuanwei Su, Nanjing (CN); Hongyuan Wang, Nanjing (CN); Hezhi Wang, Nanjing (CN); Chao Wang, Nanjing (CN)

(73) Assignee: AAG Technologies (Nanjing) Co., Ltd., Nanjing (CN)

( * ) Notice: Subject to any disclaimer, the term of this patent is extended or adjusted under 35 U.S.C. 154(b) by 298 days.

(21) Appl. No.: 18/399,714

(22) Filed: Dec. 29, 2023

(65) Prior Publication Data

US 2025/0109262 A1 Apr. 3, 2025

Related U.S. Application Data

(63) Continuation of application No. PCT/CN2023/122813, filed on Sep. 28, 2023.

(51) Int. Cl.

| | |
|---|---|
| ***C08J 5/18*** | (2006.01) |
| ***C08J 3/24*** | (2006.01) |
| ***H04R 7/04*** | (2006.01) |
| ***H04R 31/00*** | (2006.01) |

(52) U.S. Cl.

CPC .................. *C08J 5/18* (2013.01); *C08J 3/247* (2013.01); *H04R 7/04* (2013.01); *H04R 31/003* (2013.01); *C08J 2321/00* (2013.01); *H04R 2231/001* (2013.01); *H04R 2307/025* (2013.01)

(58) Field of Classification Search

CPC .......... C08J 3/247; C08J 2321/00; C08J 5/18; H04R 2231/001; H04R 2307/025; H04R 31/003; H04R 7/04

USPC .......................................................... 181/257

See application file for complete search history.

(56) References Cited

U.S. PATENT DOCUMENTS

| | | | | |
|---|---|---|---|---|
| 5,705,108 | A * | 1/1998 | Nonogaki | B29C 43/18 264/46.4 |
| 2017/0289691 | A1 * | 10/2017 | Lee | H04R 31/003 |
| 2021/0409869 | A1 * | 12/2021 | Tokura | H04R 31/003 |
| 2022/0127442 | A1 * | 4/2022 | Miyata | H04R 31/006 |

(Continued)

*Primary Examiner* — Forrest M Phillips

(74) *Attorney, Agent, or Firm* — Wiersch Law Group

(57) ABSTRACT

A rubber voice diaphragm is composed of main rubber, distortion improving agent, vulcanizing agent, accelerant, reinforcing filler, and other processing aids. The distortion improving agent is a substance with number-average molecular weight ranging from 1000 to 1000000, and structure of distortion improving agent has special chemical crosslinking points that participate in rubber vulcanization reaction. The special chemical crosslinking points are present in amount of 0.01% to 30% based on mass of distortion improving agent. The distortion improving agent is added in amount of 0.1% to 100% based on mass of main rubber. Frequency bands for improving distortion of distortion improving agent range from 0.1 HZ to 20000 Hz. In the rubber voice diaphragm provided in the present disclosure, a special distortion improving agent is selected, which solves the problems of molecular migration, poor reliability, a high modulus change rate, and poor rubber mechanical properties existing in traditional modified method.

11 Claims, 2 Drawing Sheets

(56) References Cited

U.S. PATENT DOCUMENTS

| | | | | |
|---|---|---|---|---|
| 2022/0182763 | A1* | 6/2022 | Nam | H04R 31/003 |
| 2022/0386030 | A1* | 12/2022 | Wang | H04R 9/06 |
| 2023/0167282 | A1* | 6/2023 | Yan | C08F 236/10<br>526/89 |
| 2024/0101768 | A1* | 3/2024 | Wang | C08J 5/18 |
| 2025/0109262 | A1* | 4/2025 | Su | C08J 3/247 |
| 2025/0227417 | A1* | 7/2025 | Su | C08F 212/08 |

* cited by examiner

RUBBER VOICE DIAPHRAGM AND METHOD FOR PREPARING THE SAME, AND SPEAKER

TECHNICAL FIELD

The present disclosure relates to the field of new materials, and in particular, to a rubber voice diaphragm and a method for preparing the same, and a speaker.

BACKGROUND

With the rapid development of electronic technologies and the improvement of people's living standards, consumers have more and more requirements for sound quality of speakers. Reducing total harmonic distortion (THD) of the speakers in specific frequency bands and improving sound quality of the speakers have attracted increasing attention from researchers. Voice diaphragm materials, as an important part of the speakers, can significantly reduce the THD of the speakers by controlling structures and performance of the materials.

Rubber voice diaphragms due to unique physical properties have gained favor in the field of high-end speakers. However, traditional rubber voice diaphragms are not effective in improving distortion performance of the speakers, which limits widespread application thereof to some extent. In order to improve the distortion characteristic of the speakers, those skilled in the art have conducted a large number of experiments and application researches on the voice diaphragm materials, and have proposed a variety of modified methods, such as adding fillers (such as flake fillers), resin blending modification, and combined use of rubber. Although these methods can improve the distortion of the speakers to some extent, the methods also cause problems such as increased F0 of the devices or significant changes with temperatures, poor mechanical properties, and poor reliability and dimensional stability.

Therefore, in this field, there is a urgent need of a device that has good reliability, good macroscopic physical properties, and can significantly reduce the THD in low frequency bands while maintaining good frequency response characteristics, so as to effectively improve acoustic quality of the speakers.

SUMMARY

An objective of the present disclosure is to provide a rubber voice diaphragm and a method for preparing the same, and a speaker, intended to solve the problem of poor distortion performance of the voice diaphragm in the speaker in the related art.

In order to achieve the above objective, in a first aspect, the present disclosure provides a rubber voice diaphragm, wherein components of the rubber voice diaphragm are composed of main rubber, a distortion improving agent, a vulcanizing agent, an accelerant, a reinforcing filler, and other processing aids;

wherein the distortion improving agent is a substance with number-average molecular weight ranging from 1000 to 1000000, and a structure of the distortion improving agent has special chemical crosslinking points that participate in a rubber vulcanization reaction;

the distortion improving agent is added in an amount of 0.1% to 100% based on mass of the main rubber;

the special chemical crosslinking points are present in an amount of 0.01% to 30% based on mass of the distortion improving agent;

a frequency band of the distortion improving agent for improving distortion range from 0.1 HZ to 20000 Hz;

the vulcanizing agent is added in an amount of 0.001% to 10% based on the mass of the main rubber;

the accelerant is added in an amount of 0.1% to 10% based on the mass of the main rubber;

the reinforcing filler is added in an amount of 5% to 150% based on the mass of the main rubber; and the other processing aids are added in an amount of 1% to 50% based on the mass of the main rubber; and the other processing aids comprise one or more of a mold releasing agent, an antioxidant, an anti-aging agent, a plasticizer, a dispersant, an anti-scorching agent, a dispersing aid, and an activating agent.

Optionally, the special chemical crosslinking points of the distortion improving agent comprise one or more of a double bond, a triple bond, an isocyanate group, a silicon-hydrogen bond, a silicon-chloride bond, an azide group, an epoxy group, a nitrile group, a siloxane group, a carboxyl group, a hydroxyl group, an amide group, an amino group, acyl chloride, and an acid anhydride group.

Optionally, the main rubber comprises one or more of butadiene-acrylonitrile rubber, hydrogenated butadiene-acrylonitrile rubber, butyl rubber, butadiene-styrene rubber, natural rubber, chloroprene rubber, ethylene-propylene-diene rubber, ethylene-propylene rubber, butadiene rubber, acrylic rubber, ethylene acrylate rubber, chlorosulfonated polyethylene, silicone rubber, and fluororubber.

In a second aspect, the present disclosure further provides a method for preparing the rubber voice diaphragm as described in any one of the above embodiments. The method for preparing the rubber voice diaphragm includes the following steps:

step S1: plasticating raw rubber through an open mill or an internal mixer to obtain plasticized rubber as the main rubber;

step S2: blending, according to the components of the rubber voice diaphragm, the reinforcing filler, the vulcanizing agent, the accelerant, the distortion improving agent, and the other processing aids with the plasticized rubber through a blending device, to obtain a blended sizing material;

step S3: pressing, by tape casting, the blended sizing material into a membrane by rolling or flat hot pressing; and step S4: vulcanizing and molding the membrane, and pressing the membrane into the rubber voice diaphragm.

Optionally, in step S2, the blending comprises one or more of solid-solid blending, solid-liquid blending, and liquid-liquid blending; and the blending device comprises one or more of a rubber open mill, a rubber internal mixer, and a planetary agitator.

Optionally, step S2 includes the following sub-steps: weighing components according to the components of the rubber voice diaphragm: 100 weight parts of the plasticized rubber, 10 to 100 weight parts of the reinforcing filler, 0.3 to 15 weight parts of the other processing aids, 1 to 100 weight parts of the distortion improving agent, 0.1 to 10 weight parts of the vulcanizing agent, and 0.1 to 10 weight parts of the accelerant; and sequentially adding the components at 25° C. to 100° C. by using the blending device, a subsequent component being added at an interval of 3 min to 10 min after addition of one component, and continuing the blending for 3 min to 30 min after addition of all the components.

Optionally, the other processing aids comprise one or more of a mold releasing agent, an antioxidant, an anti-aging agent, a plasticizer, a dispersant, an anti-scorching agent, a dispersing aid, and an activating agent; and in the step of weighing components according to the components of the rubber voice diaphragm, the other processing aids are: 0.1 to 5 weight parts of the mold releasing agent, 0.1 to 5 weight parts of the anti-scorching agent, and 0.01 to 5 weight parts of the anti-aging agent.

Optionally, in step S3, the blended sizing material is pressed into the membrane under conditions of 25° C. to 100° C. and 0.1 MPa to 5 MPa by a rubber flat vulcanizer.

Optionally, in step S4, in the step of vulcanizing and molding the membrane, the molding comprises one or more of hot press molding, dissolution and coating molding, and injection molding; and the vulcanizing is carried out one or more times Optionally, in step S4, the membrane is pressed into the rubber voice diaphragm under conditions of 180° C. to 210° C., 0.2 MPa, and 5 min to 20 min by a voice diaphragm press.

In a third aspect, the present disclosure further provides a speaker, wherein the speaker includes the rubber voice diaphragm as described in any one of the above embodiments.

Compared with the related art, in the rubber voice diaphragm provided in the present disclosure, a special distortion improving agent is selected, and the distortion improving agent is fixed in a rubber molecular structure through chemical bonds by controlling a chemical reaction between the special chemical crosslinking points of the distortion improving agent and a blending system such as rubber, a vulcanizing agent, and a vulcanizing aid, which solves the problems of molecular migration, poor reliability, a high modulus change rate, and poor rubber mechanical properties existing in traditional modified methods. In addition, according to the present disclosure, the structure and performance of the rubber voice diaphragm are controlled by precisely controlling the structure and chemical reaction behaviors of the distortion improving agent, which significantly improves the distortion characteristic of the speakers in low frequency bands. Meanwhile, by use of the speaker including the rubber voice diaphragm including the distortion improving agent, in the low frequency bands, THD of a speaker is significantly reduced, the sound quality is improved while there is almost no impact on resonant frequency (F0) responses.

BRIEF DESCRIPTION OF DRAWINGS

In order to more clearly illustrate the technical solutions in embodiments of the present disclosure or the related art, the accompanying drawings used in the description of the embodiments or the related art will be briefly introduced below. It is apparent that, the accompanying drawings in the following description are only some embodiments of the present disclosure, and other drawings can be obtained by those of ordinary skill in the art from the provided drawings without creative efforts.

DESCRIPTION OF EMBODIMENTS

The technical solutions in the embodiments of the present disclosure will be described clearly and completely below with reference to the accompanying drawings in the embodiments of the present disclosure. It is apparent that the described embodiments are merely some of rather than all of the embodiments of the present disclosure. All other embodiments acquired by those of ordinary skill in the art without creative efforts based on the embodiments in the present disclosure shall fall within the protection scope of the present disclosure.

The present disclosure provides a rubber voice diaphragm. The rubber voice diaphragm is composed of main rubber, a distortion improving agent, a vulcanizing agent, an accelerant, a reinforcing filler, and other processing aids.

The distortion improving agent is a substance with number-average molecular weight ranging from 1000 to 1000000, and a structure of the distortion improving agent has special chemical crosslinking points that can participate in a rubber vulcanization reaction.

The special chemical crosslinking points are present in an amount of 0.01% to 30% based on mass of the distortion improving agent.

The distortion improving agent is added in an amount of 0.1% to 100% based on mass of the main rubber.

Frequency bands for improving distortion of the distortion improving agent range from 0.1 HZ to 20000 Hz.

The vulcanizing agent is added in an amount of 0.001% to 10% based on the mass of the main rubber.

The accelerant is added in an amount of 0.1% to 10% based on the mass of the main rubber.

The reinforcing filler is added in an amount of 5% to 150% based on the mass of the main rubber.

The other processing aids are added in an amount of 1% to 50% based on the mass of the main rubber; and the other processing aids include one or more of a mold releasing agent, an antioxidant, an anti-aging agent, a plasticizer, a dispersant, an anti-scorching agent, a dispersing aid, and an activating agent.

In this embodiment, the special chemical crosslinking points of the distortion improving agent include one or more of a double bond, a triple bond, an isocyanate group, a silicon-hydrogen bond, a silicon-chloride bond, an azide group, an epoxy group, a nitrile group, a siloxane group, a carboxyl group, a hydroxyl group, an amide group, an amino group, acyl chloride, and an acid anhydride group.

In this embodiment, the main rubber includes one or more of butadiene-acrylonitrile rubber, hydrogenated butadiene-acrylonitrile rubber, butyl rubber, butadiene-styrene rubber, natural rubber, chloroprene rubber, ethylene-propylene-diene rubber, ethylene-propylene rubber, butadiene rubber, acrylic rubber, ethylene acrylate rubber, chlorosulfonated polyethylene, silicone rubber, and fluororubber.

Figure 1:
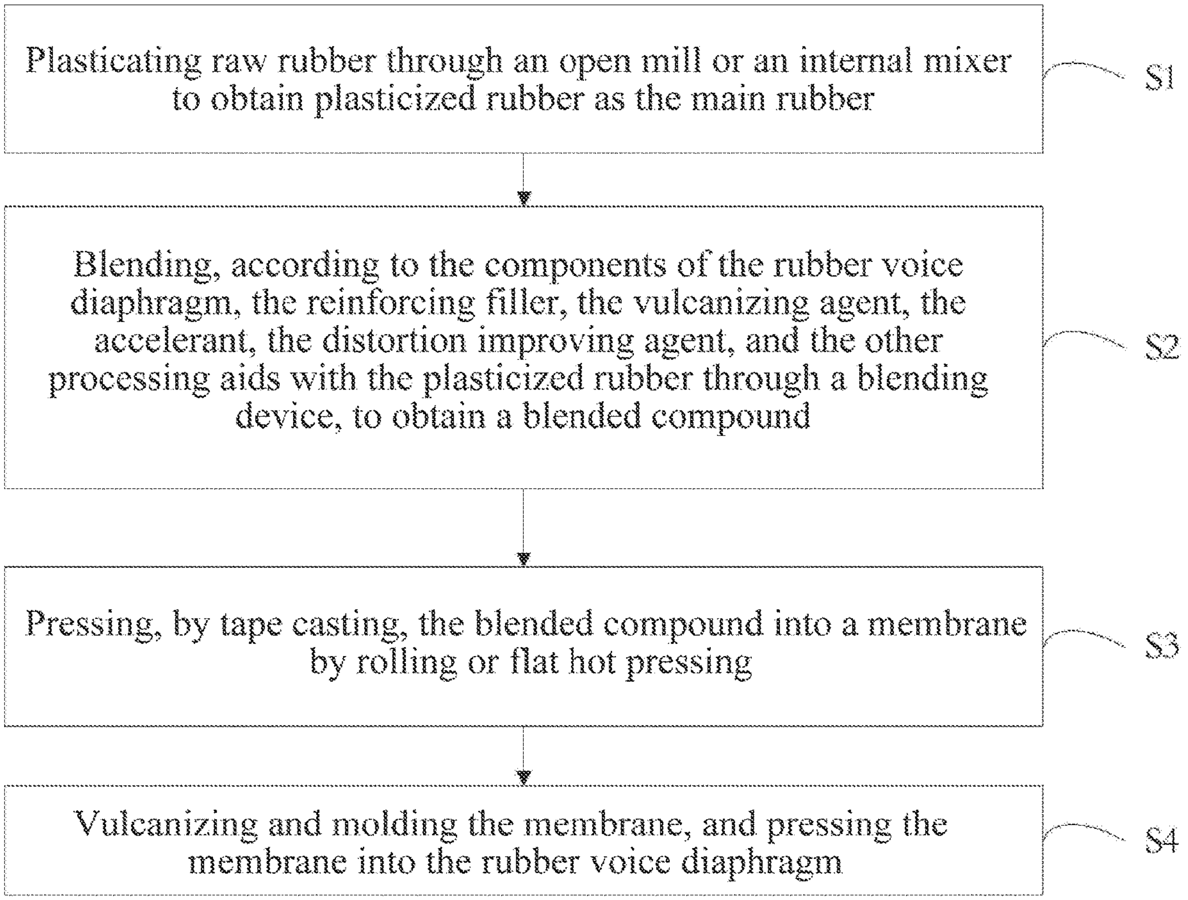
FIG. 1 is a flowchart of a method for preparing a rubber voice diaphragm according to an embodiment of the present disclosure.

Referring to FIG. 1, the present disclosure further provides a method for preparing the rubber voice diaphragm as described in the above embodiment. The method for preparing the rubber voice diaphragm includes the following steps.

In step S1, raw rubber is plasticated through an open mill or an internal mixer to obtain plasticized rubber as the main rubber.

In this embodiment, 100 weight parts of the raw rubber are weighed according to the components of the rubber voice diaphragm and are plasticated for 3 min to 30 min at 25° C. to 100° C. by using the open mill or the internal mixer.

In step S2, the reinforcing filler, the vulcanizing agent, the accelerant, the distortion improving agent, and the other processing aids are blended with the plasticized rubber through a blending device according to the components of the rubber voice diaphragm, to obtain a blended sizing material.

In this embodiment, the blending includes one or more of solid-solid blending, solid-liquid blending, and liquid-liquid blending, and the blending device includes one or more of a rubber open mill, a rubber internal mixer, and a planetary agitator.

In this embodiment, the other processing aids include one or more of a mold releasing agent, an antioxidant, an anti-aging agent, a plasticizer, a dispersant, an anti-scorching agent, a dispersing aid, and an activating agent, and step S2 includes the following sub-steps: weighing components according to the components of the rubber voice diaphragm: 100 weight parts of the plasticized rubber, 10 to 100 weight parts of the reinforcing filler, 0.3 to 15 weight parts of the other processing aids, 1 to 100 weight parts of the distortion improving agent, 0.1 to 10 weight parts of the vulcanizing agent, and 0.1 to 10 weight parts of the accelerant, and sequentially adding the components at 25° C. to 100° C. by using the blending device, a subsequent component being added at an interval of 3 min to 10 min after addition of one component, and continuing the blending for 3 min to 30 min after addition of all the components.

In this embodiment, the other processing aids include one or more of a mold releasing agent, an antioxidant, an anti-aging agent, a plasticizer, a dispersant, an anti-scorching agent, a dispersing aid, and an activating agent; and in the step of weighing components according to the components of the rubber voice diaphragm, the other processing aids are: 0.1 to 5 weight parts of the mold releasing agent, 0.1 to 5 weight parts of the anti-scorching agent, and 0.01 to 5 weight parts of the anti-aging agent.

In step S3, by tape casting, the blended sizing material is pressed into a membrane by rolling or flat hot pressing.

In this embodiment, the blended sizing material is pressed into the membrane under conditions of 25° C. to 100° C. and 0.1 MPa to 5 MPa by a rubber flat vulcanizer.

In step S4, the membrane is vulcanized and molded, and is pressed into the rubber voice diaphragm.

In this embodiment, in the step of vulcanizing and molding the membrane, the molding includes one or more of hot press molding, dissolution and coating molding, and injection molding; and the vulcanizing is carried out one or more times.

In this embodiment, the membrane is pressed into the rubber voice diaphragm under conditions of 180° C. to 210° C., 0.2 MPa, and 5 min to 20 min by a voice diaphragm press.

Embodiments of the present disclosure further provides a speaker. The speaker includes a voice diaphragm, a voice coil, a magnetic circuit unit, and a support structure. The voice diaphragm is the rubber voice diaphragm as described above. Therefore, the speaker can achieve the technical effect achieved by the rubber voice diaphragm as described above. Details are not described herein.

In this embodiment, the speaker may be applied to terminal devices such as mobile phones, smart watches, computers, speakers, televisions, and automobiles.

Compared with the related art, in the rubber voice diaphragm provided in the present disclosure, a special distortion improving agent is selected, and the distortion improving agent is fixed in a rubber molecular structure through chemical bonds by controlling a chemical reaction between the special chemical crosslinking points of the distortion improving agent and a blending system such as rubber, a vulcanizing agent, and a vulcanizing aid, which solves the problems of molecular migration, poor reliability, a high modulus change rate, and poor rubber mechanical properties existing in traditional modified methods. In addition, according to the present disclosure, the structure and performance of the rubber voice diaphragm are controlled by precisely controlling the structure and chemical reaction behaviors of the distortion improving agent, which significantly improves the distortion characteristic of the speakers in low frequency bands. Meanwhile, by use of the speaker including the rubber voice diaphragm including the distortion improving agent, in the low frequency bands, THD of a speaker is significantly reduced, the sound quality is improved while there is almost no impact on resonant frequency (F0) responses.

In order to better embody the method for preparing the rubber voice diaphragm described above, the method is further described below through preparation embodiments. It should be understood that specific embodiments described herein are only intended to explain the present disclosure and are not intended to limit the present disclosure.

Example 1

In this Example, 100 weight parts of carboxyl-containing ethylene acrylate (AEM) raw rubber were weighed and were milled at 60° C. for 10 min by using the open mill, to obtain plasticized rubber as the main rubber.

The rubber open mill was heated to 70° C., 100 weight parts of the plasticized rubber were added, 50 weight parts of reinforcing filler (N772 carbon black) were added at twice, after addition, the mixture was blended for 5 min, 1.5 weight parts of the anti-aging agent (stearic acid) and 0.5 weight parts of mold releasing agent (Armeen 18D) were added and were milled for 5 min, 1 part of the mold releasing agent (Vanfre VAM) and 0.1 weight parts of the anti-scorching agent (CTP) were added and were milled for 3 min, 1 part of the anti-aging agent (Naugard 445) was added and was milled for 3 min, 5 weight parts of the distortion improving agent were added and were milled for 5 min, and 1.5 weight parts of the vulcanizing agent (Diak NO 1) and 4 weight parts of the accelerant (DOTG) were added and were milled for 20 min, to obtain a blended sizing material.

The blended sizing material was pressed into a sheet under conditions of 70° C. and 0.5 MPa by using the rubber flat vulcanizer.

The sheet was pressed into a rubber voice diaphragm under conditions of 200° C., 0.2 MPa, and 10 min by using the voice diaphragm press.

Example 2

In this Example, 100 weight parts of carboxyl-containing ethylene acrylate (AEM) raw rubber were weighed and were milled at 60° C. for 10 min by using the open mill, to obtain plasticized rubber.

The rubber open mill was heated to 70° C., 100 weight parts of the plasticized rubber were added, 50 weight parts of reinforcing filler (N772 carbon black) were added at twice, after addition, the mixture was blended for 5 min, 1.5 weight parts of the anti-aging agent (stearic acid) and 0.5 weight parts of mold releasing agent (Armeen 18D) were added and were milled for 5 min, 1 part of the mold releasing agent (Vanfre VAM) and 0.1 weight parts of the anti-scorching agent (CTP) were added and were milled for 3 min, 1 part of the anti-aging agent (Naugard 445) was added and was milled for 3 min, 10 weight parts of the distortion improving agent were added and were milled for 5 min, and 1.5 weight parts of the vulcanizing agent (Diak NO 1) and 4 weight parts of the accelerant (DOTG) were added and were milled for 20 min, to obtain a blended sizing material.

The blended sizing material was pressed into a sheet under conditions of 70° C. and 0.5 MPa by using the rubber flat vulcanizer.

The sheet was pressed into a rubber voice diaphragm under conditions of 200° C., 0.2 MPa, and 10 min by using the voice diaphragm press.

Example 3

In this Example, 100 weight parts of carboxyl-containing ethylene acrylate (AEM) raw rubber were weighed and were milled at 60° C. for 10 min by using the open mill, to obtain plasticized rubber.

The rubber open mill was heated to 70° C., 100 weight parts of the plasticized rubber were added, 50 weight parts of reinforcing filler (N772 carbon black) were added at twice, after addition, the mixture was blended for 5 min, 1.5 weight parts of the anti-aging agent (stearic acid) and 0.5 weight parts of mold releasing agent (Armeen 18D) were added and were milled for 5 min, 1 part of the mold releasing agent (Vanfre VAM) and 0.1 weight parts of the anti-scorching agent (CTP) were added and were milled for 3 min, 1 part of the anti-aging agent (Naugard 445) was added and was milled for 3 min, 15 weight parts of the distortion improving agent were added and were milled for 5 min, and 1.5 weight parts of the vulcanizing agent (Diak NO 1) and 4 weight parts of the accelerant (DOTG) were added and were milled for 20 min, to obtain a blended sizing material.

The blended sizing material was pressed into a sheet under conditions of 70° C. and 0.5 MPa by using the rubber flat vulcanizer.

The sheet was pressed into a rubber voice diaphragm under conditions of 200° C., 0.2 MPa, and 10 min by using the voice diaphragm press.

Figure 2:
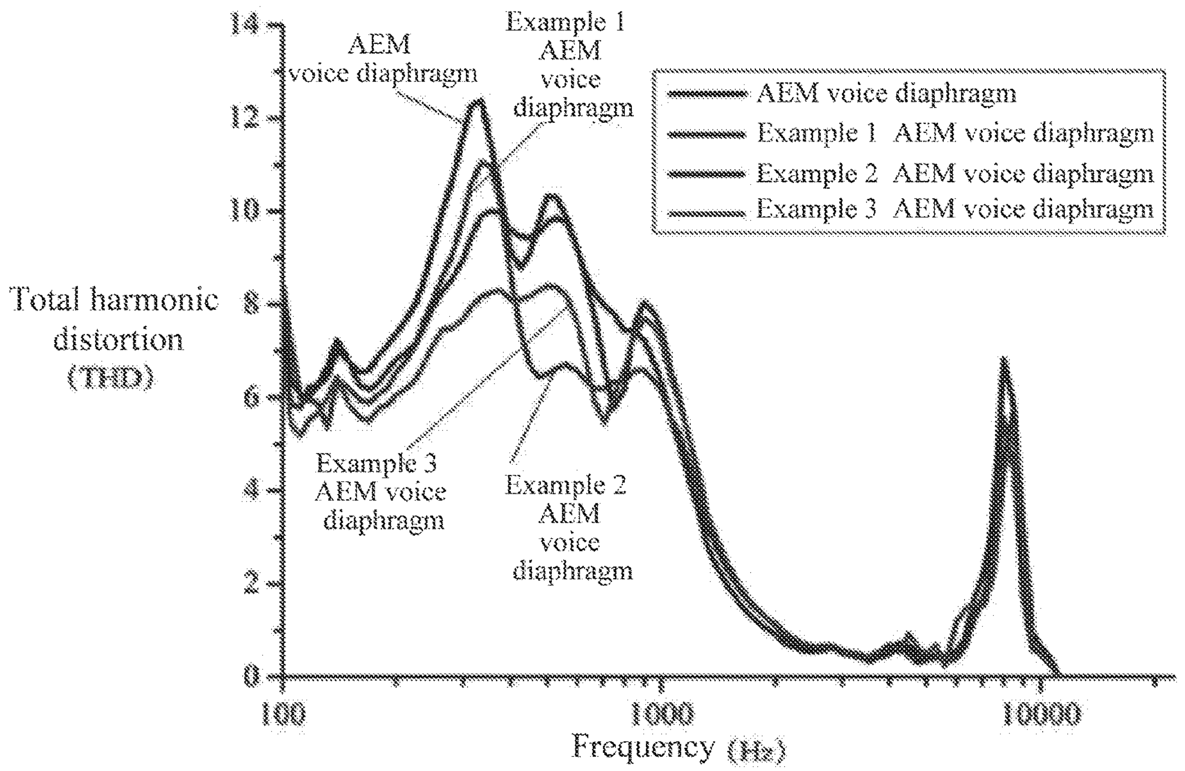
FIG. 2 is a schematic diagram of a THD curve of a speaker manufactured using a rubber voice diaphragm of the present disclosure according to an embodiment of the present disclosure.

The carboxyl-containing ethylene acrylate (AEM) rubber voice diaphragm in Example 1, Example 2, or Example 3 is selected to manufacture a speaker, THD thereof is tested, and results are shown in FIG. 2. As can be seen from the results, in the speaker using the rubber voice diaphragm with improved distortion, THD of the speaker in low frequency bands can be significantly improved.

It is to be noted that, in an example, the raw rubber includes, but is not limited to, one or more of butadiene-acrylonitrile rubber, hydrogenated butadiene-acrylonitrile rubber, butyl rubber, butadiene-styrene rubber, natural rubber, chloroprene rubber, ethylene-propylene-diene rubber, ethylene-propylene rubber, butadiene rubber, acrylic rubber, ethylene acrylate rubber, chlorosulfonated polyethylene, silicone rubber, and fluororubber. The carboxyl group-containing ethylene acrylate rubber is taken as an example in the examples, which is not intended to limit the application scope of the present disclosure.

The speaker that the rubber voice diaphragm in the present disclosure may be used for includes, but is not limited to, speakers, receivers, and other speakers. The speaker is taken as an example in the embodiments, which is not intended to limit the application scope of the present disclosure.

Although some embodiments of the present disclosure have been described in detail by way of examples, those skilled in the art should understand that the above examples are for illustrative purposes only and are not intended to limit the scope of the present disclosure. Those skilled in the art should understand that the above embodiments can be modified without departing from the scope and spirit of the present disclosure. The scope of the present disclosure is defined by the appended claims.

The above descriptions are merely embodiments of the present disclosure. It should be pointed out herein that, for those of ordinary skill in the art, improvements can be made without departing from the creative concept of the present disclosure, all of which fall within the protection scope of the present disclosure.

What is claimed is:

1. A rubber voice diaphragm, wherein components of the rubber voice diaphragm are composed of main rubber, a distortion improving agent, a vulcanizing agent, an accelerant, a reinforcing filler, and other processing aids;

wherein the distortion improving agent is a substance with number-average molecular weight ranging from 1000 to 1000000, and a structure of the distortion improving agent has special chemical crosslinking points that participate in a rubber vulcanization reaction;

the distortion improving agent is added in an amount of 0.1% to 100% based on mass of the main rubber;

the special chemical crosslinking points are present in an amount of 0.01% to 30% based on mass of the distortion improving agent;

a frequency band of the distortion improving agent for improving distortion range from 0.1 HZ to 20000 Hz;

the vulcanizing agent is added in an amount of 0.001% to 10% based on the mass of the main rubber;

the accelerant is added in an amount of 0.1% to 10% based on the mass of the main rubber;

the reinforcing filler is added in an amount of 5% to 150% based on the mass of the main rubber; and the other processing aids are added in an amount of 1% to 50% based on the mass of the main rubber; and the other processing aids comprise one or more of a mold releasing agent, an antioxidant, an anti-aging agent, a plasticizer, a dispersant, an anti-scorching agent, a dispersing aid, and an activating agent.

2. The rubber voice diaphragm as described in claim 1, wherein the special chemical crosslinking points of the distortion improving agent comprise one or more of a double bond, a triple bond, an isocyanate group, a silicon-hydrogen bond, a silicon-chloride bond, an azide group, an epoxy group, a nitrile group, a siloxane group, a carboxyl group, a hydroxyl group, an amide group, an amino group, acyl chloride, and an acid anhydride group.

3. The rubber voice diaphragm as described in claim 1, wherein the main rubber comprises one or more of butadiene-acrylonitrile rubber, hydrogenated butadiene-acrylonitrile rubber, butyl rubber, butadiene-styrene rubber, natural rubber, chloroprene rubber, ethylene-propylene-diene rubber, ethylene-propylene rubber, butadiene rubber, acrylic rubber, ethylene acrylate rubber, chlorosulfonated polyethylene, silicone rubber, and fluororubber.

4. A method for preparing a rubber voice diaphragm as described in claim 1, comprising the following steps:

step S1: plasticating raw rubber through an open mill or an internal mixer to obtain plasticized rubber as the main rubber;

step S2: blending, according to the components of the rubber voice diaphragm, the reinforcing filler, the vulcanizing agent, the accelerant, the distortion improving agent, and the other processing aids with the plasticized rubber through a blending device, to obtain a blended sizing material;

step S3: pressing, by tape casting, the blended sizing material into a membrane by rolling or flat hot pressing; and step S4: vulcanizing and molding the membrane, and pressing the membrane into the rubber voice diaphragm.

5. The method for preparing the rubber voice diaphragm as described in claim 4, wherein, in step S2, the blending comprises one or more of solid-solid blending, solid-liquid blending, and liquid-liquid blending; and the blending device comprises one or more of a rubber open mill, a rubber internal mixer, and a planetary agitator.

6. The method for preparing the rubber voice diaphragm as described in claim 4, wherein step S2 comprises the following sub-steps:

weighing components according to the components of the rubber voice diaphragm: 100 weight parts of the plasticized rubber, 10 to 100 weight parts of the reinforcing filler, 0.3 to 15 weight parts of the other processing aids, 1 to 100 weight parts of the distortion improving agent, 0.1 to 10 weight parts of the vulcanizing agent, and 0.1 to 10 weight parts of the accelerant; and sequentially adding the components at 25° C. to 100° C. by using the blending device, a subsequent component being added at an interval of 3 min to 10 min after addition of one component, and continuing the blending for 3 min to 30 min after addition of all the components.

7. The method for preparing the rubber voice diaphragm as described in claim 6, wherein, in the step of weighing components according to the components of the rubber voice diaphragm, the other processing aids are: 0.1 to 5 weight parts of the mold releasing agent, 0.1 to 5 weight parts of the anti-scorching agent, and 0.01 to 5 weight parts of the anti-aging agent.

8. The method for preparing the rubber voice diaphragm as described in claim 4, wherein, in step S3, the blended sizing material is pressed into the membrane under conditions of 25° C. to 100° C. and 0.1 MPa to 5 MPa by a rubber flat vulcanizer.

9. The method for preparing the rubber voice diaphragm as described in claim 4, wherein, in step S4, in the step of vulcanizing and molding the membrane, the molding comprises one or more of hot press molding, dissolution and coating molding, and injection molding; and the vulcanizing is carried out one or more times.

10. The method for preparing the rubber voice diaphragm as described in claim 9, wherein, in step S4, the membrane is pressed into the rubber voice diaphragm under conditions of 180° C. to 210° C., 0.2 MPa, and 5 min to 20 min by a voice diaphragm press.

11. A speaker comprising a rubber voice diaphragm as described in claim 1.

* * * * *